United States Patent
Malige et al.

(10) Patent No.: US 9,646,012 B1
(45) Date of Patent: May 9, 2017

(54) CACHING TEMPORARY DATA IN SOLID STATE STORAGE DEVICES

(71) Applicant: Veritas Technologies LLC, Mountain View, CA (US)

(72) Inventors: Raghupathi Malige, San Jose, CA (US); Daniel Fillingham, Sunnyvale, CA (US); Ryan Lefevre, Sunnyvale, CA (US); Meher Shah, Union City, CA (US)

(73) Assignee: Veritas Technologies LLC, Mountain View, CA (US)

( * ) Notice: Subject to any disclaimer, the term of this patent is extended or adjusted under 35 U.S.C. 154(b) by 200 days.

(21) Appl. No.: 14/198,760

(22) Filed: Mar. 6, 2014

(51) Int. Cl.
*G06F 17/30* (2006.01)

(52) U.S. Cl.
CPC .. *G06F 17/30082* (2013.01); *G06F 17/30132* (2013.01); *G06F 17/30218* (2013.01)

(58) Field of Classification Search
CPC ......... G06F 17/30082; G06F 17/30132; G06F 17/30218
USPC ....................................................... 707/823
See application file for complete search history.

(56) References Cited

U.S. PATENT DOCUMENTS

| | | | | |
|---|---|---|---|---|
| 5,287,473 A * | 2/1994 | Mohan | .................. | G06F 12/084 711/130 |
| 5,664,149 A * | 9/1997 | Martinez, Jr. | ....... | G06F 12/0804 711/135 |
| 5,666,514 A * | 9/1997 | Cheriton | ............. | G06F 11/1407 711/141 |
| 5,729,712 A * | 3/1998 | Whittaker | ............. | G06F 12/127 711/122 |
| 6,018,746 A * | 1/2000 | Hill | ........................ | G06F 9/466 707/679 |
| 6,018,791 A * | 1/2000 | Arimilli | .............. | G06F 12/0811 711/118 |
| 6,073,129 A * | 6/2000 | Levine | ................ | G06F 12/0813 |
| 6,292,808 B1 * | 9/2001 | Obermarck | ......... | G06F 11/1471 |
| 6,571,259 B1 * | 5/2003 | Zheng | ............... | G06F 17/30067 |
| 6,691,137 B1 * | 2/2004 | Kishi | .................. | G06F 12/0804 |
| 6,944,711 B2 * | 9/2005 | Mogi | .................. | G06F 12/0871 707/999.2 |

(Continued)

OTHER PUBLICATIONS

Weil, Sage A., et al., "Dynamic Metadata Management for Petabyte-scale File Systems", SC 2004, Pittsburgh, PA, Nov. 6-12, 2004, Article 4. 12 pages, IEEE Computer Society.*

(Continued)

*Primary Examiner* — Robert Stevens
(74) *Attorney, Agent, or Firm* — Campbell Stephenson LLP

(57) ABSTRACT

Various systems and methods for inhibiting a modified block of data from being written to an underlying persistent storage device are disclosed. A cache is maintained by a file system and the cache is implemented to temporarily cache portions of application data for an application. The application data for the application is stored on the underlying persistent storage device. Metadata is accessed if it is detected that a block of data in the cache has been modified. The metadata indicates that the block of data is not needed for the integrity of the application. In response to the metadata, the modified block of data is inhibited from being written to the underlying persistent storage device.

21 Claims, 6 Drawing Sheets

(56) References Cited

U.S. PATENT DOCUMENTS

| | | | | |
|---|---|---|---|---|
| 7,043,485 | B2* | 5/2006 | Manley | G06F 17/30212 707/658 |
| 7,340,652 | B2* | 3/2008 | Jarvis | G06F 11/1435 707/999.202 |
| 8,407,190 | B2* | 3/2013 | Prahlad | G06F 17/3002 707/692 |
| 2010/0293335 | A1* | 11/2010 | Muthiah | G06F 12/0813 711/133 |
| 2010/0332454 | A1* | 12/2010 | Prahlad | G06F 17/3002 707/654 |
| 2011/0066808 | A1* | 3/2011 | Flynn | G06F 12/0246 711/118 |
| 2011/0191522 | A1* | 8/2011 | Condict | G06F 12/123 711/103 |
| 2014/0013059 | A1* | 1/2014 | Joshi | G06F 12/0815 711/144 |
| 2014/0068197 | A1* | 3/2014 | Joshi | G06F 12/0866 711/135 |
| 2014/0082288 | A1* | 3/2014 | Beard | G06F 17/30132 711/123 |
| 2014/0237147 | A1* | 8/2014 | Joshi | G06F 12/0866 710/74 |
| 2014/0281131 | A1* | 9/2014 | Joshi | G06F 12/0804 711/103 |
| 2015/0363324 | A1* | 12/2015 | Joshi | G06F 12/084 711/141 |

OTHER PUBLICATIONS

"Cache", Wikipedia, downloaded from: en.wikipedia.org/wiki/Cache on Jan. 20, 2016, 7 pages.*

"Solid-state drive", Wikipedia, downloaded from: en.wikipedia.org/wiki/Solid-state_drive on Jan. 20, 2016, 21 pages.*

Saxena, Mohit, et al., "FlashTier: A Lightweight, Consistent and Durable Storage Cache", EuroSys '12, Bern, Switzerland, Apr. 10-13, 2012, pp. 267-280.*

Kannan, Hari, "Ordering Decoupled Metadata Accesses in Multi-processors", MICRO '09, New York, NY, Dec. 12-16, 2009, pp. 381-390.*

* cited by examiner

400

| Cache Policy 185 | | | |
|---|---|---|---|
| Block | Content | Status | Action |
| 105(1) | Header | Persistent | Write Back |
| 105(2) | Allocation Map | Non-Persistent | Delete |
| 105(3) | Body | Non-Persistent | Delete |
| 105(4) | Tail | Persistent | Write Back |
| ⋮ | ⋮ | ⋮ | ⋮ |

*FIG. 4*

CACHING TEMPORARY DATA IN SOLID STATE STORAGE DEVICES

FIELD OF THE INVENTION

This invention relates to caching data and, more particularly, to caching data in solid state storage devices.

DESCRIPTION OF THE RELATED ART

A database is a structure, managed by a database management system (DBMS) program, that organizes a collection of data. Logically, a database can organize data in a variety of ways. For example, in relational databases, data can be logically organized into table spaces. In addition to maintaining a logical organization of data, databases can also store the data they organize into data files. These data files can include data files that store user data, as well as temporary files that store copies of the user data (and any other needed data) in order to allow the DBMS to manipulate the user data and/or how the user data is being logically presented to a user. For example, if the user wants to see a logical view of the user data in which the user data is sorted based on a particular column of a table into which the data has been logically organized, the DBMS can use a temporary file to create the sorted view.

Caching is a technique that allows data that is being accessed (or is likely to be accessed in the near future) by an application, such as a DBMS, to be temporarily cached by temporarily moving that data from a slower storage device to a faster storage device. Caching can reduce the time the application takes to access data, and thus is a technique that is often used to improve application performance. Accordingly, the performance of a DBMS can be improved by caching the data it uses (whether in user data files or temporary files) in a faster storage device.

As an example, often the underlying user and temporary data used by a DBMS is stored on a set of one or more hard disk drives. While these disk drives provide cost-effective persistent storage, there are many other types of storage that provide better access performance. These other types of storage, including solid state storage devices, which are also referred to as solid state drives (SSDs), can thus be used as cache storage in order to improve the performance of the DBMS.

SUMMARY OF THE INVENTION

Various systems and methods for inhibiting a modified block of data from being written to an underlying persistent storage device are disclosed. One such method involves detecting that a block of data in a cache has been modified. The cache is maintained by a file system and the cache is implemented to temporarily cache portions of application data for an application. The application data for the application is stored on the underlying persistent storage device. The method also involves accessing metadata. The metadata indicates that the block of data is not needed for the integrity of the application. In response to the metadata, the method inhibits the modified block of data from being written to the underlying persistent storage device.

In some embodiments, the metadata contains file system metadata and cache policy metadata. The file system metadata maps one or more files to one of a plurality of underlying blocks of data. The cache policy metadata indicates one or more portions of one or more files that are necessary for the integrity of the application.

In other embodiments, the cache is implemented on a solid state drive and the application is a database application. The method may also involve detecting that a second block of data in the cache has been modified and accessing metadata. The metadata indicates that the second block of data is needed for the integrity of the application. In response to the metadata, the method allows the modified block of data to be written to the underlying persistent storage device.

In one embodiment, the inhibiting is performed when the block of data is modified. In this example, the cache is implemented as a write-through cache. In another embodiment, the inhibiting is performed when the block of data is removed from the cache. In this alternate example, the cache is implemented as a write-back cache.

In one or more embodiments, the metadata indicates that the block of data is part of a portion of a temporary file and the metadata indicates that the portion of the temporary file is not needed for the integrity of the application. The metadata can also indicate that a header and a tail of the temporary file are needed for integrity of the application.

The foregoing is a summary and thus contains, by necessity, simplifications, generalizations and omissions of detail; consequently those skilled in the art will appreciate that the summary is illustrative only and is not intended to be in any limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

FIG. 4 is a table illustrating applying a cache policy to a temporary file, according to one embodiment of the present invention.

Figure 1:
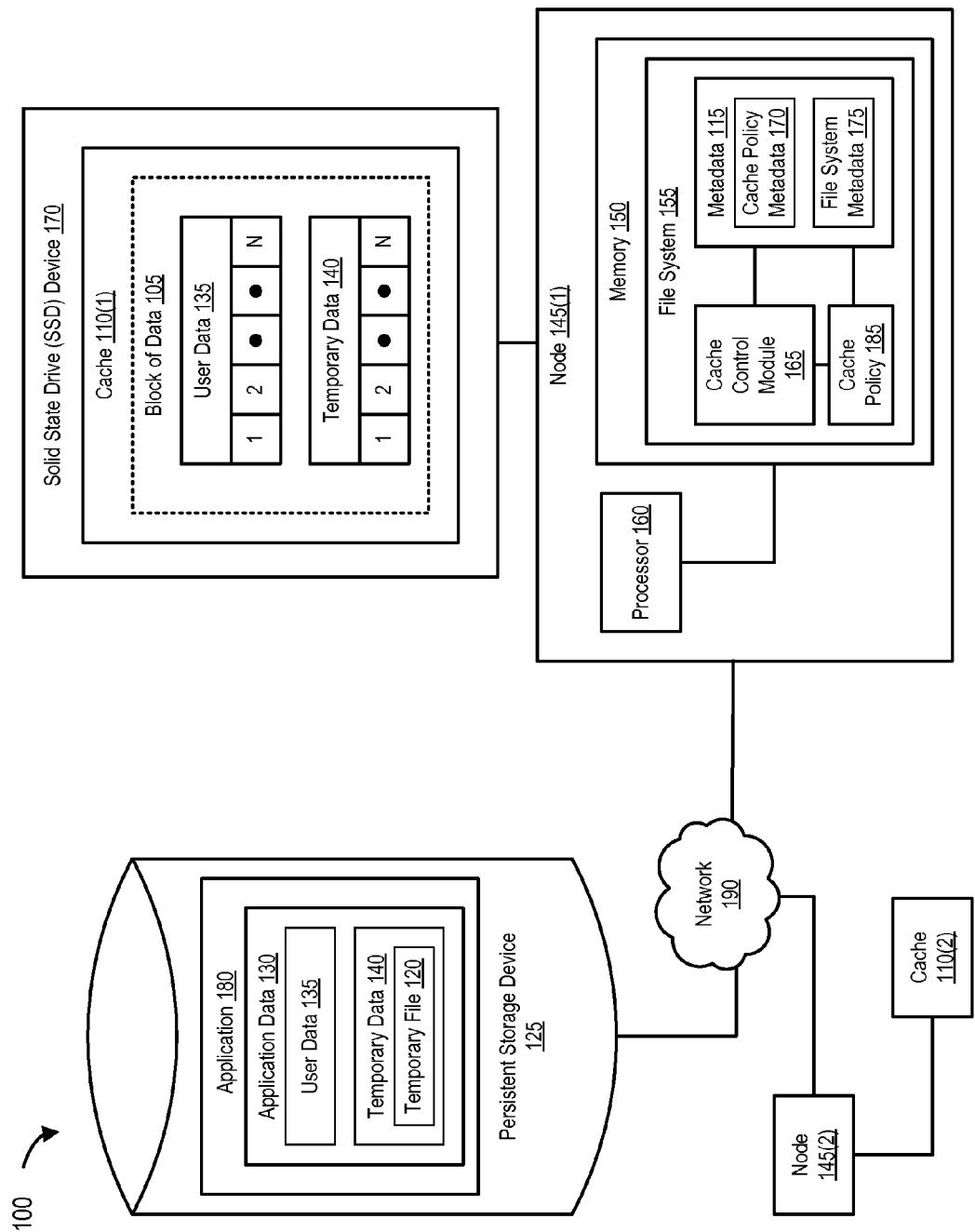
FIG. 1 is a block diagram of a computing system that uses a cache, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a block diagram of a computing system. This system includes several nodes, node 145(1) and node 145(2)

(collectively referred to as nodes 145), each of which can be coupled to its own solid state drive (SSD). As shown, node 145(1) is coupled to SSD (solid state drive) device 170 that implements a cache 110(1). Nodes 145 can each be any of a variety of different types of computing devices, including a server, personal computing device, laptop computer, net book, personal digital assistant, cellular phone, or the like.

Nodes 145 are also coupled to a persistent storage device 125. Persistent storage device 125 can include one or more of a variety of different storage devices, including hard disks, compact discs, digital versatile discs, solid state drive (SSD) memory such as Flash memory, and the like, or one or more logical storage devices such as volumes implemented on one or more such physical storage devices. Persistent storage device 125 is described as providing persistent storage because data stored on persistent storage device 125 can be maintained (e.g., for a non-negligible time, such as several minutes, hours, days, weeks, years, decades, and so on), even if the power to persistent storage device 125 and/or to a drive that reads and writes to persistent storage device 125 is interrupted or cycled off for a non-negligible time.

Node 145(1) and persistent storage device 125 can be integrated (e.g., where the persistent storage device is coupled to the node's internal processing devices by an internal bus and is built within the same chassis as the rest of the node) or separate. If separate, node 145(1) and persistent storage device 125 can be coupled by a local connection (e.g., using a technology such as Bluetooth™, Peripheral Component Interconnect (PCI), Small Computer System Interface (SCSI), or the like) or (as shown in this example) via one or more networks 190 such as the Internet or a storage area network.

In this example, node 145(1) implements a file system 155. File system 155 is a software program that organizes and controls access to files. Here, file system 155 controls access to the files used by application 180 stored on persistent storage device 125, including user data 135 and temporary data 140. File system 155 can maintain metadata (e.g., metadata 115) that identifies (e.g., by a file name) each temporary file (including directories, which are special files that can act as containers for one or more other files), as well as each temporary file's location on a storage device, each temporary file's size, and other information such as the temporary file's creation time, most recent access time, and the like. Such information can be maintained in an inode structure for certain types of files systems.

The term "file system" can refer to both the software application (which itself can be part of an operating system or database) that organizes the files and the collection of files that are organized by that application. Files can be organized hierarchically, with directories collecting groups of files and/or other directories. A file system application like file system 155 can provide another application, such as a DBMS application, with access to files (e.g., to open, read, modify, create, delete, and otherwise interact with the data within the files).

A file system application also tracks how the files it organizes map to the blocks of data within the underlying storage volume in file system metadata 175. This way, when an application such as a database requests access to a particular file (e.g., using the file name of the file), the file system can translate that request into a request for the particular blocks of data included in the requested file. Accordingly, the file system application knows which blocks of data in persistent storage device 125 belong to each file. This knowledge (based on file system metadata maintained by the file system) allows file system 155 to selectively apply different cache policies (as specified in cache policy 185) to different blocks of data, based upon the file to which each block of data belongs. In other words, file system 155 can apply a first cache policy to a first block of data in response to detecting that the first block of data belongs to a first file, but can apply a second cache policy to a second block of data in response to detecting that the second block of data is part of a second file.

Each block is a unit of data. In some embodiments, blocks are fixed-size units of data that represent the smallest granularity of data that can be manipulated by the file system application, underlying persistent storage device, and/or operating system. In other embodiments, blocks can be variably-sized, can represent a larger granularity than the smallest representable by the file system, and/or have other, different characteristics than specified here.

In this example, application data 130, which is resident on persistent storage device 125 includes user data 135 and temporary data 140. Application data 130 is a set of data that is maintained by a database application (such as a DBMS, not shown in this figure), which can be executed on node 145(1). Temporary data 140 can be maintained in one or more temporary files like temporary file 120. It is noted that this is a simplified example, and that other embodiments can include far more complex organizational schemes with a greater number of temporary files and/or directories than are shown here.

As noted above, each set of data maintained by a DBMS can be logically maintained as a set of tablespaces, which can in turn include one or more indexes and/or a set of one or more tables that themselves include one or more rows and one or more columns. User data 135 represents the data that a user (e.g., a human user or set of such users, another application, and the like) has requested the DBMS to store. Temporary data 140 can be used to allow a DBMS to manipulate user data 135. For example, the DBMS can allow users access to user data 135 using a sequential query language (SQL). Various SQL commands, such as those used to initiate sort, join, merge, or similar operations, in order to create an index for a set of user data 135, and so on, can be sent to the DBMS by a user. To implement a single database operation requested by one of these commands, multiple parallel DBMS processes may need to access, manipulate, and/or exchange data, and thus temporary data 140 can be used to facilitate this exchange. Accordingly, the DBMS can copy portions of user data 135 into temporary data 140 in order implement a database operation, which can also involve one or more DBMS processes further accessing, creating, modifying, and otherwise manipulating the temporary data 140 in order to complete the database operation.

Because user data 135 in a modern database can include very large amounts of data (e.g., in terms of gigabytes, terabytes, or larger), and because a user can specify large portions (or even all of) user data 135 to be processed in a given database operation, extremely large amounts of data may be included in temporary data 140 at a given time. Because storage devices such as persistent storage device 125 are often, due to reasons of cost, reliability, and the like, unable to provide as high access performance as other types of storage devices, the time needed to access data on such a persistent storage device is often a limiting factor. Accordingly, many systems use a storage device that can be accessed more quickly to temporarily cache the portions of the application data that are currently needed by the DBMS in order to improve DBMS performance. Here, cache 110(1)

is implemented on such a device, which in this example is SSD device 170. As the data in the cache is no longer needed by the DBMS, such data can be removed from the cache.

File system 155 executing on node 145(1) also implements a cache control module 165. Cache control module 165 is configured to manage cache 110(1). Cache control module 165 uses cache policy 185 to control which data is moved into and out of cache 110(1), as well as to control when that data is moved into and out of cache 110(1). Cache control module 165 can access cache policy 185 (which can be a set of one or more cache rules) in order determine, for a given application or set of applications, what triggers should cause data to be moved into the cache (e.g., such as that data, or a block of data in logical or physical proximity to that data, being read to and/or written to, and the like), as well as what sort of triggers should cause data to be removed from the cache (e.g., that data not having been accessed within a certain amount of time, which can be defined either in concrete terms or relative to the most recent time that other data in the cache has been accessed).

When data is being moved out of cache 110(1) (e.g., due to a cache policy-specified trigger), cache control module 165 uses cache policy metadata 170 and file system metadata 175 (collectively, these two sets of information can be simply referred to as metadata 115) to detect whether that data needs to also be written back to underlying persistent storage device 125 in order to preserve the integrity of the application using that data. The integrity of the application can be defined in a specific manner, depending upon the application being used. For example, in some DBMS systems, integrity is defined as a state in which the DBMS can be successfully recovered to a valid state after a failure. The process of recovering after a failure can be described as recovery. In many systems, an application such as a DBMS does not need the contents of a temporary file in order to have application integrity. Accordingly, cache policy 185 can specify which data is and/or is not needed in order to maintain application integrity. This specification can be made on a file-by-file basis, and can also indicate that specific parts of certain files are and/or are not needed for application integrity. For example, certain DBMS systems may require that a temporary file's header, tail, size information, and the like be maintained persistently, but that other portions of the temporary file are not needed for application integrity.

In existing cache systems, all modified blocks of data within the cache (i.e., blocks of data that the cache indicates have been modified since those blocks were moved into the cache; such blocks can also be described as "dirty" blocks) are written back to the underlying storage device (e.g., when those blocks are initially modified within the cache in a "write-though" cache implementation or when those modified blocks of data are removed from the cache in a "write-back" cache implementation). Each time data needs to be written back to the underlying storage device though, performance may be negatively affected, especially if the amount of modified data is large, as can be the case with database temporary files. However, since some of the data that can be stored in cache 110(1) may not be needed to maintain the integrity of the database, it is possible to potentially improve performance by not writing that non-integral (i.e., not needed to maintain application integrity) data back to the underlying storage device when that non-integral data is modified (in a write-through cache) or removed (in a write-back cache). Unfortunately, most conventional cache control mechanisms are implemented at the block level, such that such mechanisms cannot differentiate between different blocks based upon what file and/or portion of a file those blocks belong to. In such systems, all modified blocks in the cache must be handled in the same way (i.e., written back to the underlying storage at the appropriate time), even though that handling is unnecessary for some of those blocks.

Unlike convention block-level cache control mechanisms, cache control module 165 is implemented as part of file system 155 and thus has access to file system metadata 175 that allows blocks to be mapped to files. Additionally, cache policy metadata 170 can indicate which files and/or which portions of files within a database are and/or are not necessary for application integrity. Based upon these two sets of information, cache control module 165 can selectively handle different blocks of data differently when those blocks are modified, depending upon whether the contents of those blocks are needed to maintain application integrity or not.

Accordingly, cache control module 165 can modify block of data 105 in cache 110(1) without storing block of data 105 to underlying persistent storage device 125 (either at the time of modification in a write-through cache or at the time of removal (e.g., deletion, marking as invalid, overwriting, and the like) in a write-back cache), as long as cache policy 185 (in conjunction with metadata 115) indicates that block of data 105 is not necessary for application integrity. For example, cache control module 165 first detects that block of data 105 has been modified while in the cache. Cache control module 165 can then determine, based upon metadata 115, which file and/or portion (e.g., header, tail, body, etc.) of a file, block of data 105 belongs to. Then, cache control module 165 can access cache policy 185 to see if that file and/or portion of a file needs to be maintained for application integrity. In response to metadata 115 and cache policy 185, cache control module 165 then determines whether block of data 105 needs to be written to underlying persistent storage device 125.

Figure 2:
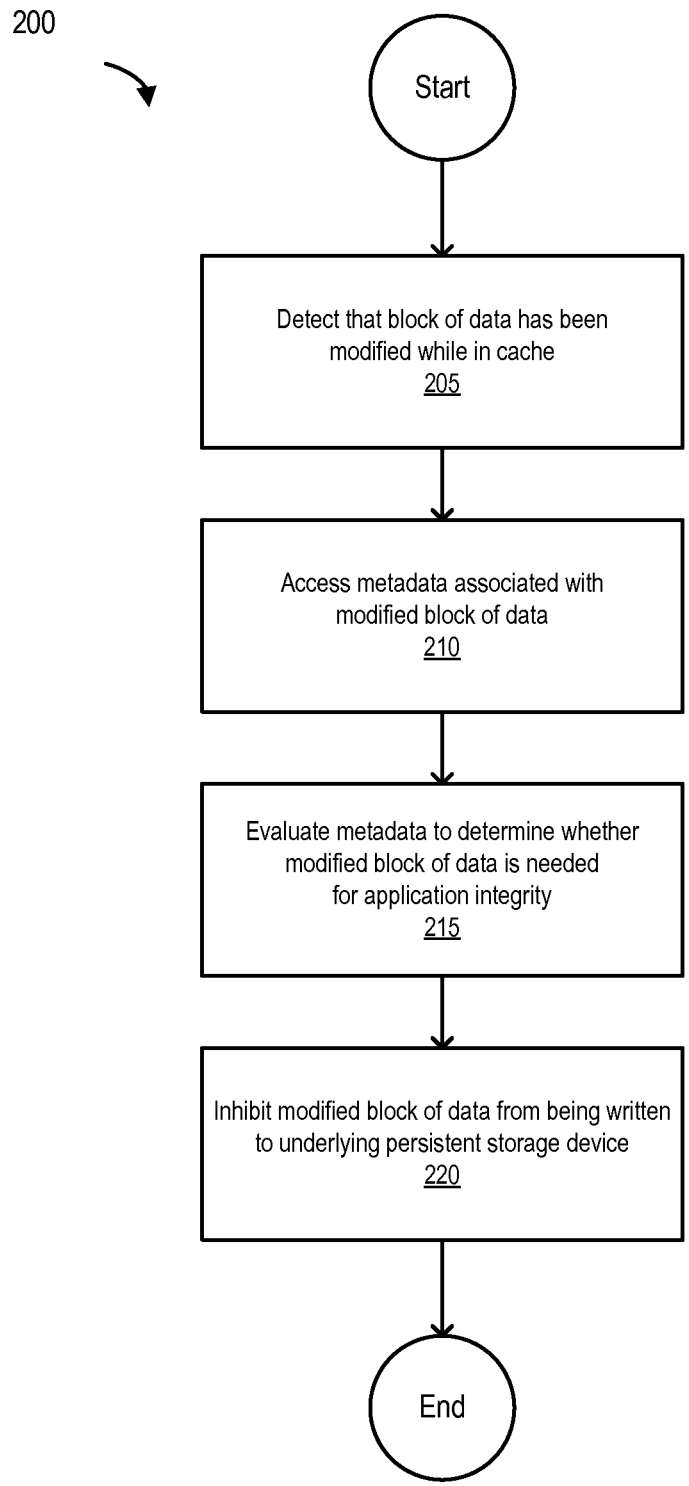
FIG. 2 is a flowchart of a method of modifying a block of data from a cache, according to embodiments of the present invention.

FIG. 2 is a flowchart of a method of modifying a block of data (e.g., such as block 105 in cache 110(1) of FIG. 1) from a cache. This method can be performed by a cache control module like cache control module 165 of FIG. 1. The method begins at 205 by detecting that block of data 105 has been modified while in the cache. This operation can be performed at the time that the block of data is modified in a write-through implementation or at the time that the block is to be removed from the cache in a write-back implementation. For example, block of data 105 may be selected for removal from cache 110(1) if it has not been accessed recently (e.g., as determined by a Least Recently Used (LRU) algorithm specified in a cache policy such as cache policy 185 of FIG. 1). Under an existing cache management methodology, a modified block of data would be written back to persistent storage before being removed from a cache. In operation 210, the method accesses metadata 115 associated with block of data 105. In operation 215, metadata 115 (which can include file system metadata 175 mapping files to blocks of data as well as cache policy metadata 170 indicating which files and/or portions of files are needed (or not needed) for application integrity) is evaluated to determine that block of data 105 is not needed for application integrity. For example, and as applicable to an example database, if a block of data is part of a temporary file, and if the block is not part of a portion of the temporary file (such as a header, a tail or an allocation map) that is required for application integrity, as specified in a cache policy, the new value of that modified block may not need to be stored persistently. The method ends at operation 220 with the modified block of data not being written (through or back, depending on the cache setting) to underlying persistent storage device 125.

In some embodiments, the method detects that block of data 105 in cache 110(1) has been modified. Cache 110(1) is maintained by file system 155 and cache 110(1) is implemented to temporarily cache portions of application data 130 for application 180. Application data 130 for application 180 is stored on underlying persistent storage device 125. In other embodiments, the method accesses metadata 115. Metadata 115 indicates that block of data 105 is not needed for the integrity of application 180. In response to metadata 115, the modified block of data is inhibited from being written to underlying persistent storage device 125. In some embodiments, eliminating writes of modified data that is not needed for application integrity from cache 110(1) to underlying persistent storage device 125 can improve the input and/or output (I/O) response of the system. As such, eliminating such writes may also, in at least some embodiments, improve the performance of application 180 for which the caching is being performed.

Figure 3:
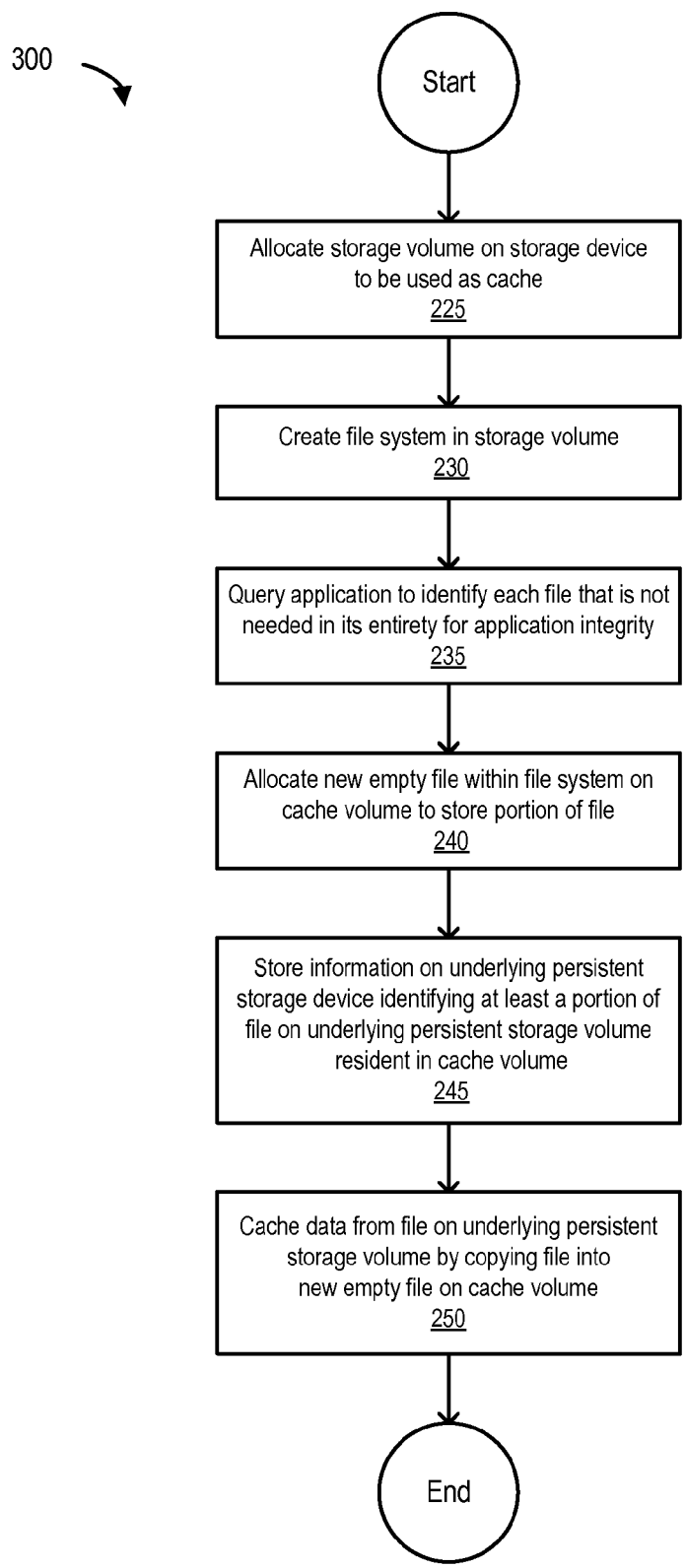
FIG. 3 is a flowchart of a method of creating a cache managed by a file system cache control module, according to one embodiment of the present invention.

FIG. 3 is a flowchart of a method of creating a cache managed by a file system cache control module. This creates an environment in which the method of FIG. 2 can be implemented. This method can be performed by an administrator and/or file system of FIG. 1. The method begins at operation 225 by allocating a storage volume on a storage device (e.g., such as SSD device 170 of FIG. 1) to be used as a cache. For example, a storage volume may be created and assigned a SSD Logical Unit Number (LUN) that is local to a node. At operation 230, the method creates a file system in the storage volume. The file system is managed by a file system application that maintains file system metadata mapping each file within the volume to one or more blocks within the volume. The file system also has access to a cache policy that specifies how files in the cache represented by the volume are to be managed.

The method can then generate file-specific caching rules to be stored as part of the cache policy used by the file system. The method, at operation 235, queries application 180 (e.g., a DBMS) to identify each file (e.g., each temporary file) used by application 180 that is not needed in its entirety for application integrity. Additionally, the method can query application 180 and/or a user (e.g., using a graphical user interface, command line interface, application programming interface, or the like) in order to identify whether any portions of such a file are needed for application integrity. Based upon these queries, a set of cache rules can be generated and stored as part of cache policy 185. These rules indicate which files and or portions of files are needed and/or not needed for application integrity.

When it is time to cache at least a portion of a file (e.g., as indicated by a trigger condition specified in cache policy) from the underlying persistent storage volume in the cache volume, at operation 240, the file system application can allocate a new, empty file within the file system on the cache volume to store that data. At operation 245, the file system application also stores information on the underlying persistent storage device identifying that at least a portion of the file on the underlying persistent storage volume is now resident in a cache volume. Then, at operation 250, data from the underlying file (on the underlying persistent storage volume) can be cached by copying that data into the new file on the cache volume. Blocks within the file in the cache volume can be moved in and out of the cache as needed (e.g., to implement the cache policy).

If the underlying volume is being accessed by multiple nodes (e.g., as part of a clustered application implementation), whenever a block of data in the cache volume is modified, the corresponding block can also be marked invalid or otherwise locked on the underlying storage device, thus preventing different nodes from seeing different values of that block at the same time.

FIG. 4 is a table illustrating applying cache policy 185 to temporary file 120. Cache policy 185 can include qualitative information about one or more files and/or portions of those files that indicates whether those files are needed to maintain application integrity. For example, cache policy 185 may store information about a temporary file identifying the header, body, tail, and allocation map associated with that temporary file (and that those portions are needed for application integrity). In some embodiments, identifying a portion of the file involves identifying the blocks (e.g., in terms of the first X blocks of the file, the last Y blocks of the file, and so on, where X and Y are integers representing the number of blocks making up a particular portion of a file) that make up that portion of the file. Other portions of the temporary file, such as the body, can be identified as not being needed for application integrity. While both types of data—integral and non-integral can be identified, it is noted that other embodiments can simply identify all of one type or the other, thus implying that any non-identified types are of the other type.

In some embodiments, the use of a write-through cache policy (i.e., in which data is written back to the underlying storage device as it is modified in the cache, as opposed to a write-back policy, in which modified data in the cache is only written back to the underlying storage device when it is time to remove that data from the cache) can be used to maintain application integrity in situations in which the application is a clustered application. In clustering, instances of the application are simultaneously executing on different nodes, but each instance operates on the same underlying application data stored on the underlying persistent storage device. However, each node can have its own file-system implemented cache. Here, by forcing integral data (i.e., data that is necessary for application integrity) to be written back to the underlying storage device when it is modified in the cache, new values of the integral data are always available to all of the nodes in the cluster at the same time. As such, there is no risk that different nodes in the cluster will be using different values of that integral data at the same time.

As an example, in a clustered database application, certain portions of a temporary file are integral. Accordingly, whenever one of these portions of the temporary file is modified in any node's cache, that portion of the temporary file will also be written back to the underlying storage device used by all of the nodes. Typically, such a write-back operation is implemented atomically, so that the operation will succeed or fail only in its entirety (e.g., if the write to the underlying storage device fails, the write to the cache will also not be completed, thus preventing two different values of the integral data from existing at the same time).

Some databases support an autoextend operation, by which the size of a temporary file can be automatically increased as needed. At the same time, the size of the temporary file can be part of the data that is needed for database integrity. Accordingly, in a clustered system, if one node triggers the autoextend operation, the new size of the temporary file will need to be written back to the underlying storage device as part of an atomic write-back operation from the cache in order to maintain system integrity.

The cache policy can also identify the particular handing to be taken with respect to the identified data (e.g., whether data needs to be written back to the underlying persistent storage device if modified or whether the data does not need to be written back). While the handling can be explicitly specified, in some embodiments this handling is implicit based upon the type of data (integral or non-integral) and thus does not need to be explicitly specified in the cache policy.

In some embodiments, cache policy 185 may be provided when the application is initialized by a system administrator. For example, a database administrator can use a graphical or command line interface to the file system application in order to specify that a header block and a tail block of a database temporary file as being integral, while an allocation map may be made non-integral as it is not needed for database recovery. Based on this input, the file system can update the cache policy to include the information provided by the administrator.

Alternatively, a file system developer may encode the cache policy for certain standard, well-known applications into a preconfigured set of cache policies that are included as part of the file system application. In these embodiments, an administrator does not need to provide information identifying which files or portions of files are integral and/or non-integral to the file system, since such information is already present within the file system's cache policy. Some such embodiments may also let a user update such a cache policy (e.g., to supplement and/or modify the preconfigured policy that the file system already contains), or allow a user to add new cache policies for new types of applications for which preconfigured cache policies are not already available within the file system.

Figure 5:
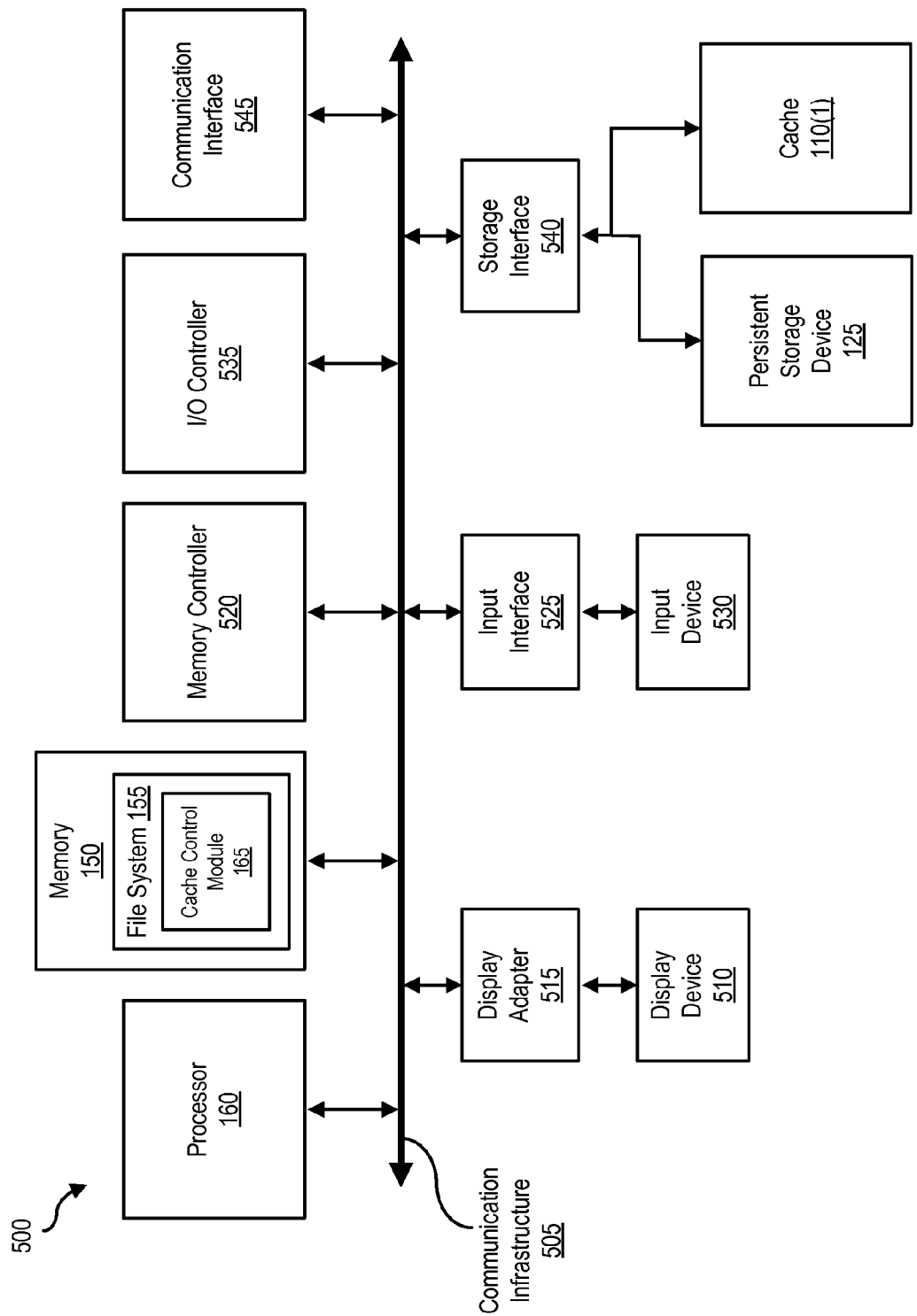
FIG. 5 is a block diagram of a computing device, illustrating how a cache control module can be implemented in software, according to one embodiment of the present invention.

FIG. 5 is a block diagram of a computing system 500 capable of implementing a cache control module 155 as described above. Computing system 500 broadly represents any single or multi-processor computing device or system capable of executing computer-readable instructions. Examples of computing system 500 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 500 may include at least one processor 160 and a system memory 150. By executing the software that implements cache control module 165, computing system 500 becomes a special purpose computing device that is configured to inhibit a modified block of data from being written to an underlying persistent storage device.

Processor 160 generally represents any type or form of processing unit capable of processing data or interpreting and executing instructions. In certain embodiments, processor 160 may receive instructions from a software application or module. These instructions may cause processor 160 to perform the functions of one or more of the embodiments described and/or illustrated herein. For example, processor 160 may perform and/or be a means for performing all or some of the operations described herein. Processor 160 may also perform and/or be a means for performing any other operations, methods, or processes described and/or illustrated herein.

Memory 150 generally represents any type or form of volatile or non-volatile storage device or medium capable of storing data and/or other computer-readable instructions. Examples of memory 150 include, without limitation, random access memory (RAM), read only memory (ROM), flash memory, or any other suitable memory device.

Although not required, in certain embodiments computing system 500 may include both a volatile memory unit (such as, for example, memory 150) and a non-volatile storage device (such as, for example, persistent storage device 125 and/or cache 110(1), as described in detail below). In one example, program instructions implementing a cache control module 165 may be loaded into memory 150.

In certain embodiments, computing system 500 may also include one or more components or elements in addition to processor 160 and memory 150. For example, as illustrated in FIG. 5, computing system 500 may include a memory controller 525, an Input/Output (I/O) controller 540, and a communication interface 550, each of which may be interconnected via a communication infrastructure 505. Communication infrastructure 505 generally represents any type or form of infrastructure capable of facilitating communication between one or more components of a computing device. Examples of communication infrastructure 505 include, without limitation, a communication bus (such as an Industry Standard Architecture (ISA), Peripheral Component Interconnect (PCI), PCI express (PCIe), or similar bus) and a network.

Memory controller 525 generally represents any type or form of device capable of handling memory or data or controlling communication between one or more components of computing system 500. For example, in certain embodiments memory controller 525 may control communication between processor 160, memory 150, and I/O controller 540 via communication infrastructure 505. In certain embodiments, memory controller 525 may perform and/or be a means for performing, either alone or in combination with other elements, one or more of the operations or features described and/or illustrated herein.

I/O controller 540 generally represents any type or form of module capable of coordinating and/or controlling the input and output functions of a computing device. For example, in certain embodiments I/O controller 540 may control or facilitate transfer of data between one or more elements of computing system 500, such as processor 160, memory 150, communication interface 550, display adapter 520, input interface 530, and storage interface 545.

Communication interface 550 broadly represents any type or form of communication device or adapter capable of facilitating communication between computing system 500 and one or more additional devices. For example, in certain embodiments communication interface 550 may facilitate communication between computing system 500 and a private or public network including additional computing systems. Examples of communication interface 550 include, without limitation, a wired network interface (such as a network interface card), a wireless network interface (such as a wireless network interface card), a modem, and any other suitable interface. In at least one embodiment, communication interface 550 may provide a direct connection to a remote server via a direct link to a network, such as the Internet. Communication interface 550 may also indirectly provide such a connection through, for example, a local area network (such as an Ethernet network), a personal area network, a telephone or cable network, a cellular telephone connection, a satellite data connection, or any other suitable connection.

In certain embodiments, communication interface 550 may also represent a host adapter configured to facilitate communication between computing system 500 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like.

Communication interface 550 may also allow computing system 500 to engage in distributed or remote computing. For example, communication interface 550 may receive instructions from a remote device or send instructions to a remote device for execution.

As illustrated in FIG. 5, computing system 500 may also include at least one display device 515 coupled to communication infrastructure 505 via a display adapter 520. Display device 515 generally represents any type or form of device capable of visually displaying information forwarded by display adapter 520. Similarly, display adapter 520 generally represents any type or form of device configured to forward graphics, text, and other data from communication infrastructure 505 (or from a frame buffer, as known in the art) for display on display device 515.

As illustrated in FIG. 5, computing system 500 may also include at least one input device 535 coupled to communication infrastructure 505 via an input interface 530. Input device 535 generally represents any type or form of input device capable of providing input, either computer or human generated, to computing system 500. Examples of input device 535 include, without limitation, a keyboard, a pointing device, a speech recognition device, or any other input device.

As illustrated in FIG. 5, computing system 500 may also include a persistent storage device 125 and a cache 110(1) coupled to communication infrastructure 505 via a storage interface 545. Devices 125 and 110(1) generally represent any type or form of storage device or medium capable of storing data and/or other computer-readable instructions. For example, devices 125 and 110(1) may each include a magnetic disk drive (e.g., a so-called hard drive), a floppy disk drive, a magnetic tape drive, an optical disk drive, a flash drive, or the like. Storage interface 545 generally represents any type or form of interface or device for transferring data between storage devices 125 and 110(1) and other components of computing system 500. A storage device like persistent storage device 125 can store information such as temporary file 120 of FIG. 1, as described above.

In certain embodiments, devices 125 and 110(1) may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Devices 125 and 110(1) may also include other similar structures or devices for allowing computer software, data, or other computer-readable instructions to be loaded into computing system 500. For example, devices 125 and 110(1) may be configured to read and write software, data, or other computer-readable information. Devices 125 and 110(1) may also be a part of computing system 500 or may be a separate device accessed through other interface systems.

Many other devices or subsystems may be connected to computing system 500. Conversely, all of the components and devices illustrated in FIG. 5 need not be present to practice the embodiments described and/or illustrated herein. The devices and subsystems referenced above may also be interconnected in different ways from that shown in FIG. 5.

Computing system 500 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 500 for storage in memory via a network such as the Internet or upon a carrier medium.

The computer-readable medium containing the computer program may be loaded into computing system 500. All or a portion of the computer program stored on the computer-readable medium may then be stored in memory 150 and/or various portions of devices 125 and 110(1). When executed by processor 160, a computer program loaded into computing system 500 may cause processor 160 to perform and/or be a means for performing the functions of one or more of the embodiments described and/or illustrated herein. Additionally or alternatively, one or more of the embodiments described and/or illustrated herein may be implemented in firmware and/or hardware. For example, computing system 500 may be configured as an application specific integrated circuit (ASIC) adapted to implement one or more of the embodiments disclosed herein.

Figure 6:
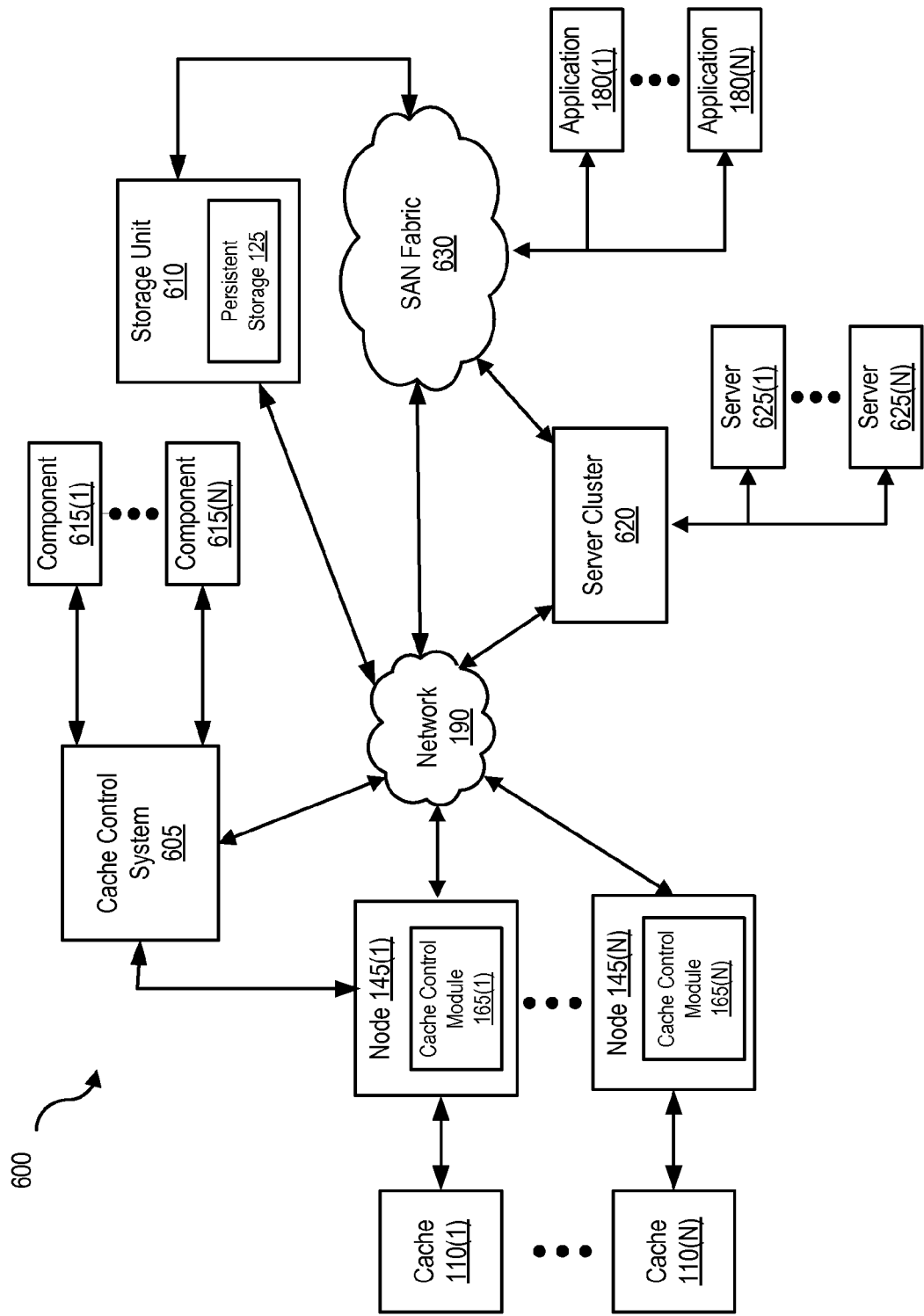
FIG. 6 is a block diagram of a networked system, illustrating how various computing devices can communicate via a network, according to one embodiment of the present invention.

FIG. 6 is a block diagram of a network architecture 600 in which cache control system 605, nodes 145(1)-(N) with corresponding caches 110(1)-(N), and storage unit 610 may be coupled to a network 190. Nodes 145(1)-(N) generally represent any type or form of computing device or system, such as computing system 500 in FIG. 5.

Similarly, servers 625(1)-(N) generally represent computing devices or systems, such as application servers or database servers, configured to provide various database services and/or run certain software applications. Network 190 generally represents any telecommunication or computer network including, for example, an intranet, a wide area network (WAN), a local area network (LAN), a personal area network (PAN), or the Internet. In one example, the cache control system 605 and nodes 145(1)-145(N) may include a cache control module 165 as shown in FIGS. 1 and 5.

As illustrated in FIG. 6, a storage unit 610 may be directly attached to node 145(1). Similarly, one or more caches 110(1)-(N) may be directly attached to nodes 145(1)-(N). Storage unit 610 with persistent storage device 125 generally represents any type or form of storage device or medium capable of storing data and/or other computer-readable instructions. In certain embodiments, persistent storage device 125 may represent network-attached storage (NAS) devices configured to communicate with nodes 145(1)-(N) using various protocols, such as Network File System (NFS), Server Message Block (SMB), or Common Internet File System (CIFS).

Servers 625(1)-(N) may also be connected to a storage area network (SAN) fabric 630. SAN fabric 630 generally represents any type or form of computer network or architecture capable of facilitating communication between multiple storage devices. SAN fabric 630 may facilitate communication between servers 625(1)-(N), applications 180

(1)-(N) and a plurality of storage devices. SAN fabric 630 may also facilitate, via network 190, communication between cache control system 605, persistent storage device 125 and caches 110(1)-(N). As with storage unit 610, persistent storage device 125 and caches 110(1)-(N) generally represent any type or form of storage device or medium capable of storing data and/or other computer-readable instructions.

In certain embodiments, and with reference to computing system 500 of FIG. 5, a communication interface, such as communication interface 550 in FIG. 5, may be used to provide connectivity between cache control system 605 and network 190. Cache control system 605 may be able to access information related to applications 180(1)-(N) using, for example, a web browser or other client software. Such software may allow cache control system 605 to access data hosted by servers 625(1)-(N), persistent storage device 125, or caches 110(1)-(N). Although FIG. 6 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 625, a database application, node 145, persistent storage device 125, cache 110(1), or any combination thereof. All or a portion of one or more of the embodiments disclosed herein may also be encoded as a computer program, stored in server 625, run by server 625, and distributed to cache control system 605 over network 190.

In some examples, all or a portion of the computing devices in FIGS. 1, 5 and 6 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a cache control module 165 in FIG. 1 may transform behavior of a computing device in order to cause the computing device to inhibit a modified block of data from being written to an underlying persistent storage device.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   detecting that a plurality of blocks of data in a cache has have been modified, wherein
      the cache is maintained by a file system,
      the plurality of blocks belong to a plurality of files and/or a plurality of portions of a file of the plurality of files,
      the cache is implemented to temporarily cache portions of application data for an application, and
      the application data for the application is stored on an underlying persistent storage device;
   accessing metadata, wherein
      the file system comprises the metadata,
      the metadata indicates that a block of data of the plurality of blocks of data is not needed for integrity of the application, and
      the integrity of the application is based, at least in part, on whether the block of data is required to restore the application; and
   in response to the metadata, inhibiting the block of data from being written to the underlying persistent storage device, and writing the plurality of blocks of data, other than the block of data, to the underlying persistent storage device.

2. The method of claim 1, wherein
   the metadata in the file system comprises file system metadata and cache policy metadata, and
   the file system metadata permits a cache policy of a plurality of cache policies to be applied to be modified block of data by mapping of each of one or more files of the plurality of files or each of one or more portions of the file to one of the plurality of blocks of data, based on the cache policy metadata that identifies the one or more files or the one or more portions of the one or more files that are necessary for the integrity of the application.

3. The method of claim 2, wherein
   the inhibiting comprises
      accessing the file system metadata and the cache policy metadata in the file system, and
      applying a first cache policy of the plurality of cache policies when the block of data is modified in the cache and the cache is implemented as a write-through cache.

4. The method of claim 2, wherein
   the inhibiting comprises
      accessing the file system metadata and the cache policy metadata in the file system, and
      applying a second cache policy of the plurality of cache policies when the block of data is removed from the cache and the cache is implemented as a write-through cache.

5. The method of claim 1, wherein
   the cache is implemented on a solid state drive, and
   the application is a database application.

6. The method of claim 1, comprising
   detecting that a second block of data in the cache has been modified;
   accessing the metadata, wherein
      the metadata indicates that the second block of data is needed for the integrity of the application; and
   in response to the metadata, allowing the modified block of data to be written to the underlying persistent storage device as part of the plurality of modified blocks of data.

7. The method of claim 2, wherein
   the file system metadata indicates that the block of data is part of a portion of a temporary file, and
   the cache policy metadata indicates that the portion of the temporary file is not needed for the integrity of the application.

8. The method of claim 7, wherein
   the metadata identifies only a header or a tail of the temporary file are needed for the integrity of the application because the block of data is only part of the header or the tail.

9. The method of claim 1, further comprising:
as part of the accessing,
selecting a cache policy of a plurality of cache policies from the file system; and
as part of the inhibiting,
applying the cache policy to the modified block of data.

10. A computer readable storage medium comprising program instructions executable to:
detect that a plurality of blocks of data in a cache have been modified, wherein
the cache is maintained by a file system,
the plurality of blocks belong to a plurality of files and/or a plurality of portions of a file of the plurality of files,
the cache is implemented to temporarily cache portions of application data for an application, and
the application data for the application is stored on an underlying persistent storage device;
access metadata, wherein
the file system comprises the metadata,
the metadata indicates that a block of data of the plurality of blocks of data is not needed for integrity of the application, and
the integrity of the application is based, at least in part, on whether the block of data is required to restore the application; and
in response to the metadata, inhibit the block of data from being written to the underlying persistent storage device, and write the plurality of blocks of data, other than the block of data, to the underlying persistent storage device.

11. The computer readable storage medium of claim 10, wherein
the metadata in the file system comprises file system metadata and cache policy metadata, and
the file system metadata permits a cache policy of a plurality of cache policies to be applied to be modified block of data by mapping of each of one or more files of the plurality of files or each of one or more portions of the file to one of the plurality of blocks of data, based on the cache policy metadata that identifies the one or more files or the one or more portions of the one or more files that are necessary for the integrity of the application.

12. The computer readable storage medium of claim 11, wherein
the inhibiting comprises
accessing the file system metadata and the cache policy metadata in the file system, and
applying a first cache policy of the plurality of cache policies when the block of data is modified in the cache and the cache is implemented as a write-through cache.

13. The computer readable storage medium of claim 10, wherein
the cache is implemented on a solid state drive, and
the application is a database application.

14. The computer readable storage medium of claim 10, comprising
detecting that a second block of data in the cache has been modified;
accessing the metadata, wherein
the metadata indicates that the second block of data is needed for the integrity of the application; and
in response to the metadata, allowing the modified block of data to be written to the underlying persistent storage device as part of the plurality of modified blocks of data.

15. The computer readable storage medium of claim 11, wherein
the inhibiting comprises
accessing the file system metadata and the cache policy metadata in the file system, and
applying a second cache policy of the plurality of cache policies when the block of data is removed from the cache and the cache is implemented as a write-through cache.

16. A system comprising:
one or more processors; and
a memory coupled to the one or more processors, wherein the memory stores program instructions executable by the one or more processors to:
detect that a plurality of blocks of data in a cache have been modified, wherein
the cache is maintained by a file system,
the plurality of blocks belong to a plurality of files and/or a plurality of portions of a file of the plurality of files,
the cache is implemented to temporarily cache portions of application data for an application, and
the application data for the application is stored on an underlying persistent storage device;
access metadata, wherein
the file system comprises the metadata,
the metadata indicates that a block of data of the plurality of blocks of data is not needed for integrity of the application, and
the integrity of the application is based, at least in part, on whether the block of data is required to restore the application; and
in response to the metadata, inhibit the block of data from being written to the underlying persistent storage device, and write the plurality of blocks of data, other than the block of data, to the underlying persistent storage device.

17. The system of claim 16, wherein
the metadata in the file system comprises file system metadata and cache policy metadata, and
the file system metadata permits a cache policy of a plurality of cache policies to be applied to be modified block of data by mapping of each of one or more files of the plurality of files or each of one or more portions of the file to one of the plurality of blocks of data, based on the cache policy metadata that identifies the one or more files or the one or more portions of the one or more files that are necessary for the integrity of the application.

18. The system of claim 16, wherein
the cache is implemented on a solid state drive, and
the application is a database application.

19. The system of claim 16, comprising
detecting that a second block of data in the cache has been modified;
accessing the metadata, wherein
the metadata indicates that the second block of data is needed for the integrity of the application; and
in response to the metadata, allowing the modified block of data to be written to the underlying persistent storage device as part of the plurality of modified blocks of data.

20. The system of claim 16, wherein
the inhibiting comprises
  accessing the file system metadata and the cache policy metadata in the file system; and
  applying to the block,
    a first cache policy of the plurality of cache policies when the block of data is modified in the cache and the cache is implemented as a write-through cache, or
    a second cache policy of the plurality of cache policies when the block of data is removed from the cache and the cache is implemented as a write-back cache.

21. The system of claim 16, wherein
the file system metadata indicates that the block of data is part of a portion of a temporary file, and
the metadata cache policy indicates that the portion of the temporary file is not needed for the integrity of the application, and
the metadata identifies only a header or a tail of the temporary file are needed for the integrity of the application because the block of data is only part of the header or the tail.

* * * * *